United States Patent [19]

Becnel

[11] 4,149,743
[45] Apr. 17, 1979

[54] CARTON LINER REMOVAL TONGS

[75] Inventor: Larry H. Becnel, West Covina, Calif.

[73] Assignee: General Dynamics Corporation, Pomona, Calif.

[21] Appl. No.: 892,234

[22] Filed: Mar. 31, 1978

[51] Int. Cl.² ............................................. B65G 7/12
[52] U.S. Cl. .................................................... 294/26
[58] Field of Search ................ 294/26, 25, 15, 49, 294/61, 55.5; 24/230.5; 81/8.1; 224/45 P, 45 Q, 45 T

[56] References Cited

U.S. PATENT DOCUMENTS

| | | | |
|---|---|---|---|
| 555,681 | 3/1896 | Dalton | 294/26 |
| 1,426,257 | 8/1922 | Brazyski et al. | 294/26 |
| 2,999,310 | 9/1961 | Pope | 294/26 |

Primary Examiner—James B. Marbert
Attorney, Agent, or Firm—Neil F. Martin; Edward B. Johnson

[57] ABSTRACT

A pair of carton liner removal tongs for use in removing carton liners from cartons includes an elongated shaft portion with a knife blade like hook extending outward from one end and a looped handle at the other end extending on the opposite side of the shaft from the hook. The tongs are used in removing a liner from a carton by first inserting the hook end of the tong downward between the walls of the liner and carton on opposite sides of the liner. The handles of the respective tong members are then brought together above the carton liner and grasped by one hand for pulling the liner upward and out of the carton.

9 Claims, 5 Drawing Figures

CARTON LINER REMOVAL TONGS

BACKGROUND OF THE INVENTION

The present invention relates to packaging tools and techniques and pertains particularly to tongs for the removal of carton liners.

Many articles of various shapes and sizes are often packed and shipped in cardboard containers or cartons. An inner lining snuggly fitting within the inside of the carton is frequently used to hold the article in position and prevent it from shifting during shipment. The liner thus must fit snuggly around both the article and the carton in order to effectively serve its purpose. Therefore, it is frequently difficult to remove the liner from around the article and from the carton without destroying the carton or damaging the article.

Articles shipped in this manner are frequently fragile and must be handled with great care, both in the shipping and packaging and removal from the package. The present invention was developed for use in conjunction with the shipment of radomes. Radomes are usually of a generally conical shape and can be shipped in a carton with an inner liner disposed in the carton around the radome. The inner liner is usually provided with a central opening through which the pointed or small end of the radome protrudes. In order to inspect the radome after packing, but before shipping, it is necessary to remove the liner from the carton. In such an instance there should be no damage to the carton or the radome during the removal of the liner for this purpose.

It has been found that two persons are normally required to remove the liner from the radome packed in a carton without damage to the carton or the radome. One person is required to hold the radome down while the other person holds the carton down and pulls the liner up out of the carton. With the normally snug fits required for shipping, this task requires considerable dexterity and can be accomplished only with difficulty.

It is therefore desirable that some method and apparatus be available for easily and conveniently removing carton liners without undue damage to the liner, the carton, or the contents thereof.

SUMMARY AND OBJECTS OF THE INVENTION

It is therefore the primary object of the present invention to overcome the above problems of the prior art.

Another object of the present invention is to provide means for quickly and conveniently removing carton liners from cartons without damages thereto.

A further object of the present invention is to provide a tool for permitting a lone individual to remove a carton liner from a carton quickly and effectively without damage to the carton, liner, or contents thereof.

In accordance with the primary aspect of the present invention, carton liner tongs are provided which include an elongated shaft with a hook at one end of the elongated shaft and a handle at the other end of the elongated shaft, the tongs to be used in pairs with the hooks hooked into the carton liner and the handles brought together for grasping by one hand of a lone individual for pulling the liner from the carton.

BRIEF DESCRIPTION OF THE DRAWINGS

The above and other objects and advantages of the present invention will become apparent from the following description when read in conjunction with the drawings, wherein.

DETAILED DESCRIPTION OF THE PREFERRED EMBODIMENT

Figure 1:
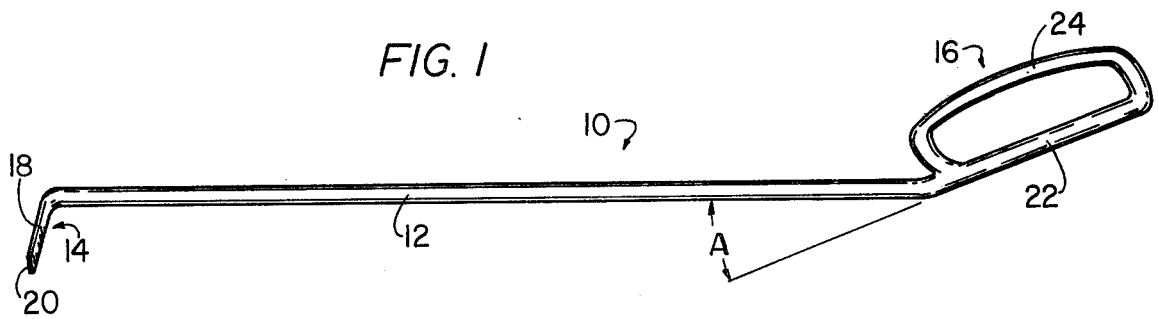
FIG. 1 is a top plan view of a tong in accordance with the invention.

Turning to FIG. 1 of the drawing, a tong in accordance with the invention is illustrated. The tong is designed to be utilized in pairs in accordance with the method of the invention. Since the tongs are identical in size, shape and configuration in the preferred arrangement, only a single tong will be specifically described.

The tong, as illustrated in FIG. 1, designated generally by the numeral 10 comprises an elongated shaft portion 12 which may be constructed of any suitable stock, such as cylindrical rod or the like, and including a hook 14 on one end and a generally looped handle 16 on the opposite end of the shaft 12.

The hook 14 in the preferred embodiment comprises a substantially flat sharp blade extending outward at substantially 90° from the shaft 12 and having sharpened side edges 18 and a sharp end 20 for cutting into carton liners. The hook can have a sharp corner edge between the front portion 20 and the side edges 18 and thereby not require an exceptionally sharp knife like edge along the side. The tong is designed to be used in conjunction with cardboard liners to be described.

The handle portion of the tong 16 is of a generally loop shaped configuration with a generally elongated looped configuration having a substantially straight side 22 defined by essentially an extension of the shaft 12. The side 22 extends at an angle A to the shaft 12 of approximately 30°. Some latitude of perhaps 10° to 15° to either side of this angle may be provided in certain situations, depending on the configuration of the box, or carton and liner, to which the tools are adapted. The handle 16 includes a generally C-shaped portion 24 which in conjunction with the side 22 defines a loop for receiving the fingers of a hand. The looped portion extends from the side of the shaft 12 on the opposite side of the shaft from the hook 14. With this arrangement, a pair of the tongs can be utilized for hooking into or connecting to the liner of a carton for lifting the liner from the carton.

Figure 2:
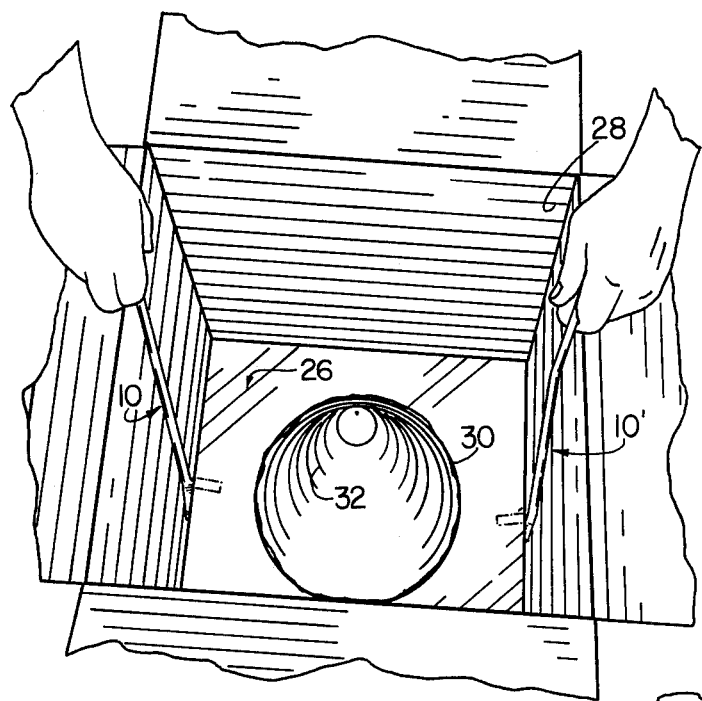
FIG. 2 is a top perspective view of an inner liner showing a pair of tongs being put into position for engagement with the liner.
Figure 4:
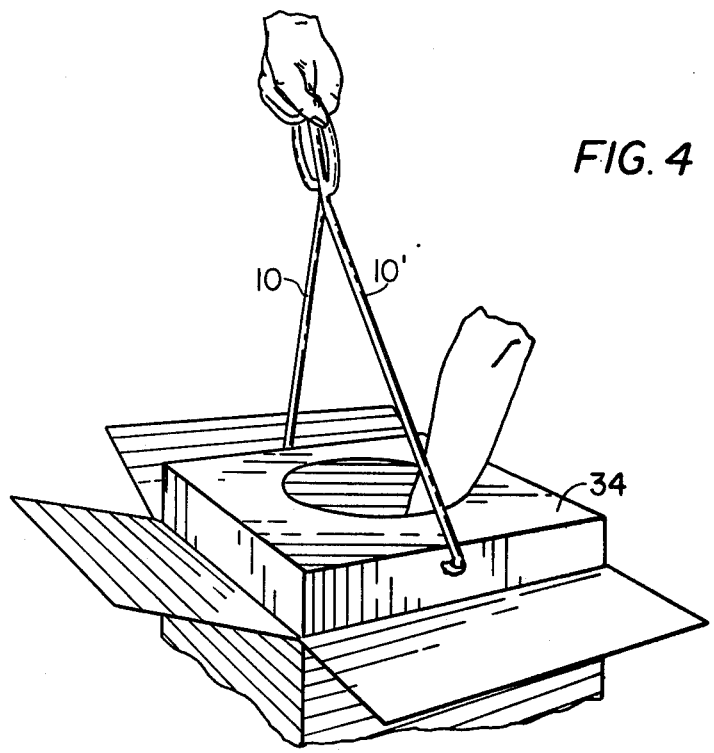
FIG. 4 is a perspective view illustrating the tongs withdrawing the liner from the carton.
Figure 5:
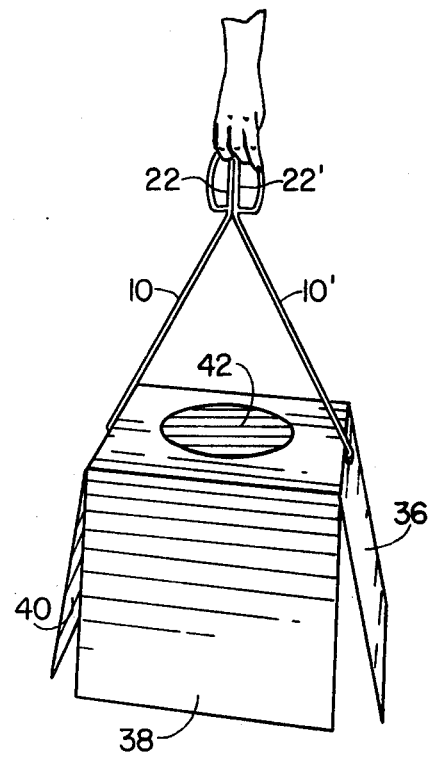
FIG. 5 is a top perspective view of the liner suspended from a pair of tongs.

As best illustrated in FIG. 2, a pair of the tongs designated by the numerals 10 and 10' are utilized in conjunction with the removal of a cardboard liner 26 from a cardboard carton 28. The carton 28 is of a substantially deep configuration and includes a tight fitting liner 22 having a top with an opening 30 through which protrudes, in the illustrated embodiment, a radome 32. The liner 26 holds the radome in place within the carton in a central position therein. The liner, as best illustrated in FIGS. 4 and 5, has a top or upper wall panel 34 in which the opening 30 is formed and downwardly appending side walls 36, 38, 40 and 42, all of which extend downward in close fitting engagement inside the walls of the carton 28.

As will be appreciated from viewing FIGS. 1 and 2, for example, a close fitting engagement of the liner within the carton prevents the grasping of the sides of the liner by means of the hands or the like and would necessitate the liner in and around the opening 30 in the absence of some form of tool, such as that of the present invention.

Figure 3:
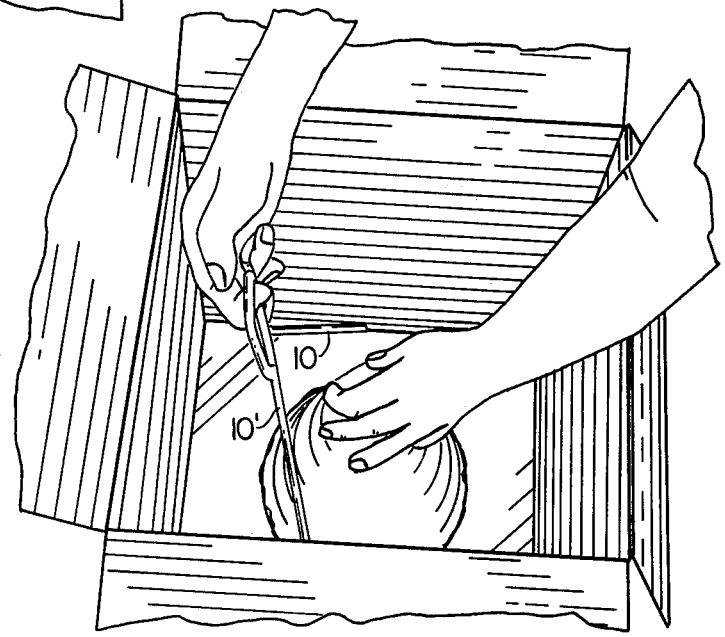
FIG. 3 is a top perspective view of the carton of FIG. 2, illustrating the pair of tongs being placed into one hand.

By use of the tongs of the present invention a pair of tongs 10 and 10′, as illustrated in FIG. 2, are each grasped or held in the separate hands of an individual as illustrated and the hook end thereof extended downward, as shown, between the carton liner 26 and the walls of the carton 28. When the hook ends or portions of the tongs have extended below the surface panel 34 of the liner, the tongs are rotated approximately 90°, thus extending the sharp hook portions into the walls 36 and 40 of the liner. The hook portions should be sharp enough to penetrate the liner without undue force. The handle ends of the tongs are then brought together as shown in FIG. 3, above the carton liner and above the radome 32 when the carton is setting upright and a force is then applied upwardly on the tongs thus applying an upward force on the liner, pulling it upward and outward from the box as shown in FIG. 4. This is accomplished by one hand of the individual who grasps the handle of each of the separate tongs 10 and 10′. The handles of the tong portions are such as shown in FIG. 5, that the portions 22 thereof extend substantially parallel as shown in FIG. 5 in abutting engagement and thus when grasped as shown acts as a single tool. This abutting engagement with the extension portions 22 of the handles of the respective tongs enhances the stability of the tongs in their use as illustrated.

Thus, with my invention as described above, I have provided a method and apparatus for quickly and conveniently removing the liner of a carton. This method and apparatus permits a lone individual to quickly, easily and efficiently remove a liner from a carton with fragile articles therein leaving one hand free to steady the fragile article during the removal process.

While I have illustrated and described my invention by means of a specific embodiment, it is to be understood that numerous changes and modifications may be made therein without departing from the spirit and scope of the invention as defined in the appended claims.

Having described my invention, I now claim:

1. A pair of cooperating carton liner removal tongs, each tong comprising:
   an elongated shaft,
   a hook member on one end of said shaft extending outwardly at a substantially right angle thereto, said hook having at least one sharped edge for penetrating a cardboard liner when rotated about the axis of said shaft, and
   a handle on the other end of said shaft, said handle having a generally looped configuration having one side of the loop defined by an extension of said shaft extending at an angle to the shaft.

2. The carton liner removal tong of claim 1, wherein said hook is shaped to define a generally flat blade lying in a plane intersecting the axis of the shaft at a generally right angle thereto.

3. The carton liner removal tong of claim 1, wherein said handle is defined by an elongated loop, and said one side of the loop defined by the extension of said shaft is substantially straight and extends at an angle of approximately thirty degrees to the shaft.

4. The carton liner removal tong of claim 2, wherein said handle is defined as an elongated loop extending to the side of said shaft opposite said shaft from said hook member, and
   the angle of said extension is approximately thirty degrees.

5. A method of removing a liner from a carton comprising the steps of:
   selecting handle means capable of being manipulated by a single hand,
   attaching said handle means to the liner, and
   grasping said handle means by one hand and applying a force to the liner by means of the handle means in a direction for pulling the liner from the carton.

6. The method of claim 5, wherein the step of selecting handle means comprises selecting a pair of separate identical tongs each tong having an elongated shaft with hook means at one end of the shaft and handle means at the other end of the shaft.

7. The method of claim 6, wherein the step of attaching the handle means to the liner includes extending the hook means of one of said tongs into one side of the liner and extending the hook of the other tong in the opposite side of the liner, and
   the step of grasping said handle means includes bringing the handle means of the two separate tongs together above the liner.

8. The method of claim 7, including the step of orienting the opening of said container upwardly and applying said force in the vertical direction.

9. The method of claim 7, wherein the step of extending the hook means into the liner includes the steps of:
   extending the hook means of each tong between the walls of the liner and carton, and
   rotating the respective tongs approximately ninety degrees about the axis of its shaft.

* * * * *